Nov. 3, 1959  L. A. BEVACQUA  2,910,885
PUSHBUTTON GEARSHIFT SELECTOR
Filed Sept. 20, 1957  2 Sheets-Sheet 1

INVENTOR.
Louis A. Bevacqua
BY Mueller & Aichele
Attys.

Nov. 3, 1959
L. A. BEVACQUA
2,910,885
PUSHBUTTON GEARSHIFT SELECTOR
Filed Sept. 20, 1957
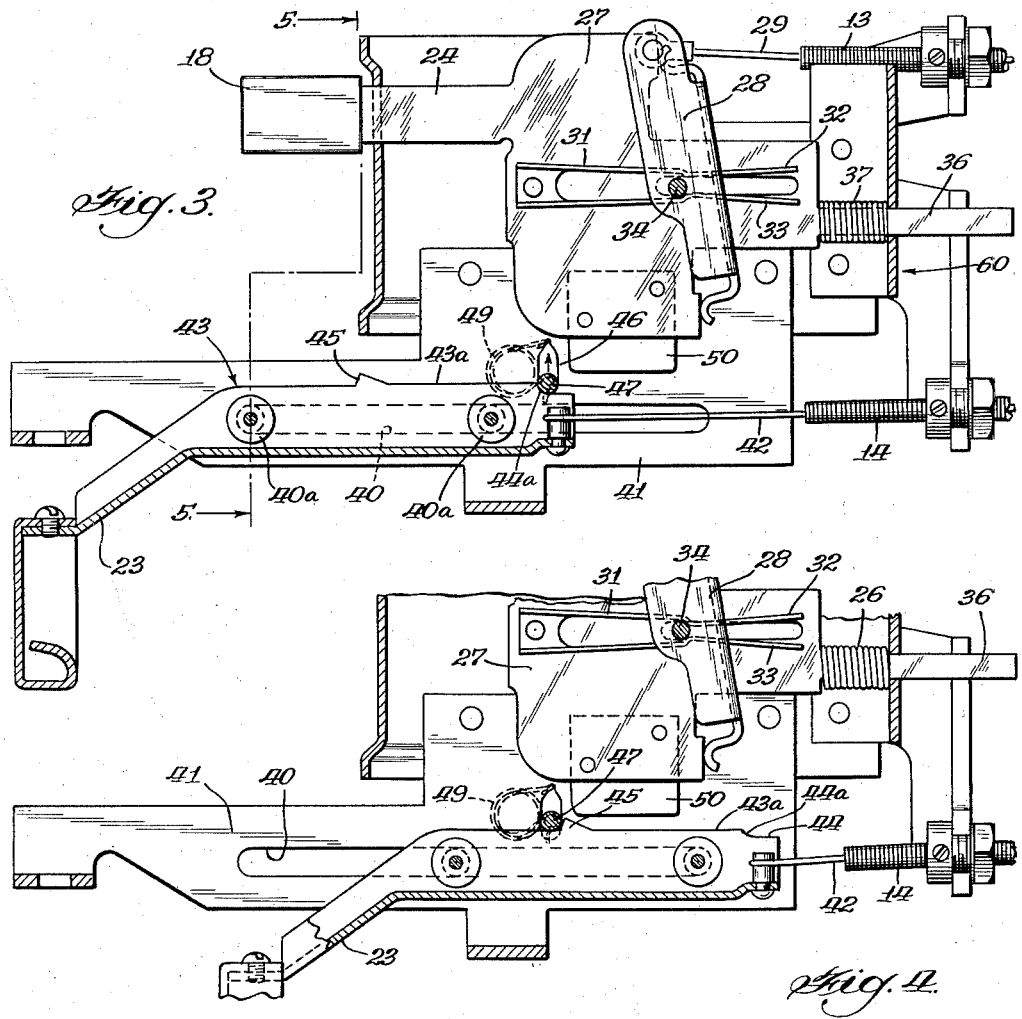
Fig. 3.
Fig. 4.
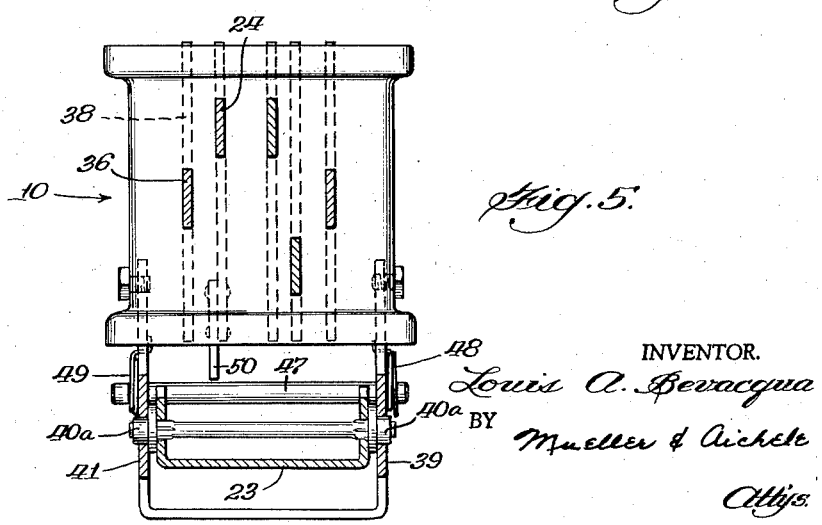
Fig. 5.
INVENTOR.
Louis A. Bevacqua
BY
Mueller & Aichele
Attys.

United States Patent Office 2,910,885
Patented Nov. 3, 1959

2,910,885

PUSHBUTTON GEARSHIFT SELECTOR

Louis A. Bevacqua, Des Plaines, Ill., assignor to Motorola, Inc., Chicago, Ill., a corporation of Illinois Application September 20, 1957, Serial No. 685,228

8 Claims. (Cl. 74—473)

This invention relates to selector devices and more particularly to an improved selector device incorporating desirable safety features for use in the control of the transmission of an automobile.

Automobiles having automatic transmissions have been provided with pushbutton selectors so that the driver may select a particular gear setting simply by depressing a pushbutton. In addition to pushbuttons, such selector devices commonly include a slidable member employed to lock the automobile transmission when the automobile is parked and which is therefore referred to as a "park" slide. In the event the park slide should be inadvertently actuated while the transmission is in one of the drive positions, the sudden locking might produce serious damage. Since the park slide is most conveniently positioned adjacent the pushbuttons controlling the gear selection, such inadvertent actuation of the park slide can easily occur.

Since it is possible to start the automobile engine while the park slide is actuated and the transmission locked, a driver who has forgotten that the park slide is actuated may inadvertently depress one of the drive buttons without having released the park slide to unlock the transmission. This may also result in serious damage to the automobile.

It is an object of the invention to provide a pushbutton selector for an automatic transmission of an automobile which can be operated with a minimum possibility of damage to the automobile by inadvertent actuation of the control means.

It is another object of the present invention to provide a selector device for the automatic transmission of an automobile which effectively prevents locking the transmission of the automobile if the transmission is in any gear other than neutral.

It is another object of the invention to provide a pushbutton selector for an automatic transmission in which it is impossible to shift into any of the driving gears while the transmission is locked by actuation of a park slide.

A feature of the invention is the provision of a transmission control having a transverse locking bar which is held by the neutral pushbutton against a longitudinally movable park slide to lock the park slide in position so that it cannot be moved until the neutral pushbutton has been actuated. This is accomplished by engagement of the locking bar by a projection on an arm actuated by the neutral pushbutton.

Another feature of the invention is the spring mounting of the locking bar so that it is positioned by a surface of the park slide, when the slide is in its actuated position, so the bar interferes with longitudinal movement of the neutral pushbutton from its actuated position. This prevents the automobile transmission from being shifted to any drive setting while the transmission is locked by the park slide being in its actuated position.

In the drawings:

Fig. 3 is a view in section taken through the selector device and showing the neutral pushbutton arm in its actuated position;

Fig. 4 is a view similar to Fig. 3 but showing the park slide member in its actuated position; and Fig. 5 is a view in section taken on the line 5—5 of Fig. 3.

In accordance with this invention, a selector device for automatic transmission control in an automobile includes a longitudinally slidable transmission locking or park slide member which has a transverse locking bar positioned to ride on its upper surface. The locking bar is adapted to prevent longitudinal movement thereof by bearing against a sloping shoulder on the top surface of the park slide. The pushbutton arm which is actuated to set the transmission in neutral is provided with a camming member which has a projection limiting the movement of the locking bar when the neutral pushbutton arm is in its unactuated position. Since the projection limits movement of the locking bar which in turn limits movement of the park slide, the latter cannot be moved to its actuated position while the automobile transmission is at a setting other than neutral. When the neutral pushbutton arm is actuated, the projection is moved longitudinally and no longer interferes with the movement of the locking bar. Therefore, when the transmission is set in neutral the park slide can be pushed longitudinally to its actuated position with the locking bar being capable of displacement so that it rides along the upper surface of the slide.

When both the neutral pushbutton arm and the park slide are in their actuated positions, the locking bar is positioned adjacent the projection from the neutral cam and effectively holds the cam and the arm of which it is a part in actuated position. Therefore, the neutral pushbutton arm cannot be released if one of the other pushbutton arms is mistakenly actuated and its cam brought against the treadle member which controls the setting of the transmission selecting cable. When the park slide is moved to its unactuated position and the transmission is unlocked, the locking bar, held against the upper surface of the slide by a spring, drops into a depressed lip portion formed by the sloping shoulder on the surface and out of the way of the projection from the neutral cam so that the latter can move back to its unactuated position when another pushbutton arm is actuated and the gear setting can be changed. It is impossible, therefore, to inadvertently set the transmission to one of its drive positions while the transmission is locked.

Figure 1:
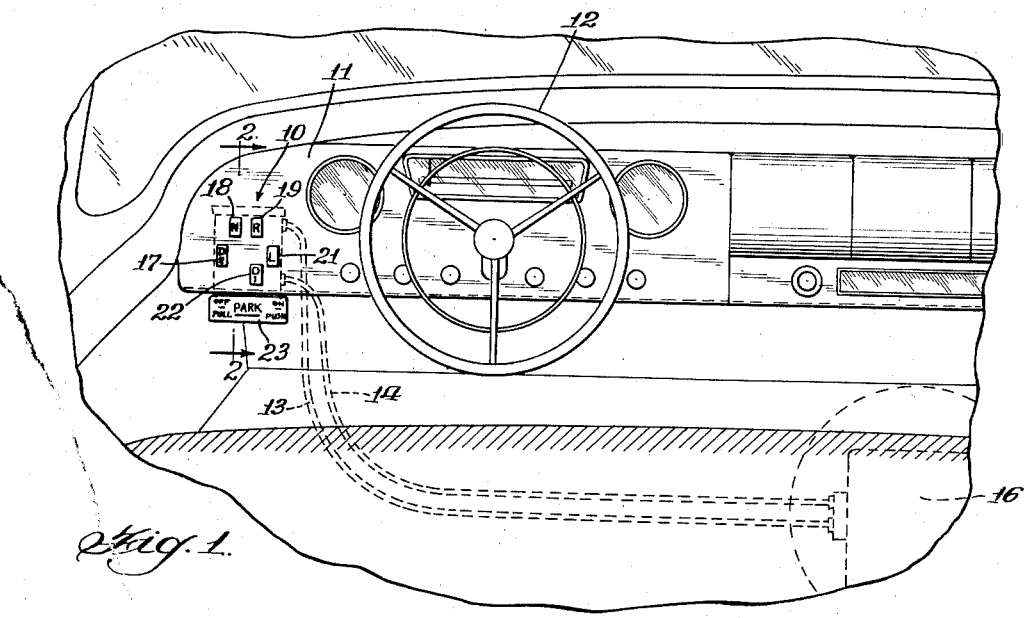
Fig. 1 is a view of the dashboard of an automobile showing a gear selector having pushbuttons for the desired gear settings and showing in dotted lines the cable connections to the automatic transmission which is controlled thereby.

In Fig. 1 of the drawings, a pushbutton selector 10 is shown positioned on the dashboard 11 of an automobile. Although the selector 10 is shown as located to the left of a steering wheel 12, it will be understood that it may be positioned in any other convenient location on the dashboard 11 or elsewhere. Control cables 13 and 14 shown in dotted lines are connected to the automobile transmission generally indicated at 16. The cable 13 serves to control the various transmission settings and the cable 14 to lock and unlock the transmission.

The selector 10 is shown as including five pushbuttons 17, 18, 19, 21 and 22 which respectively select second drive, neutral, reverse, low and first drive transmission settings. The selector also includes a longitudinally slidable transmission locking member or park slide 23. It will be understood, of course, that different numbers of pushbuttons will be included if a different number of transmission settings are to be obtained.

Figure 2:
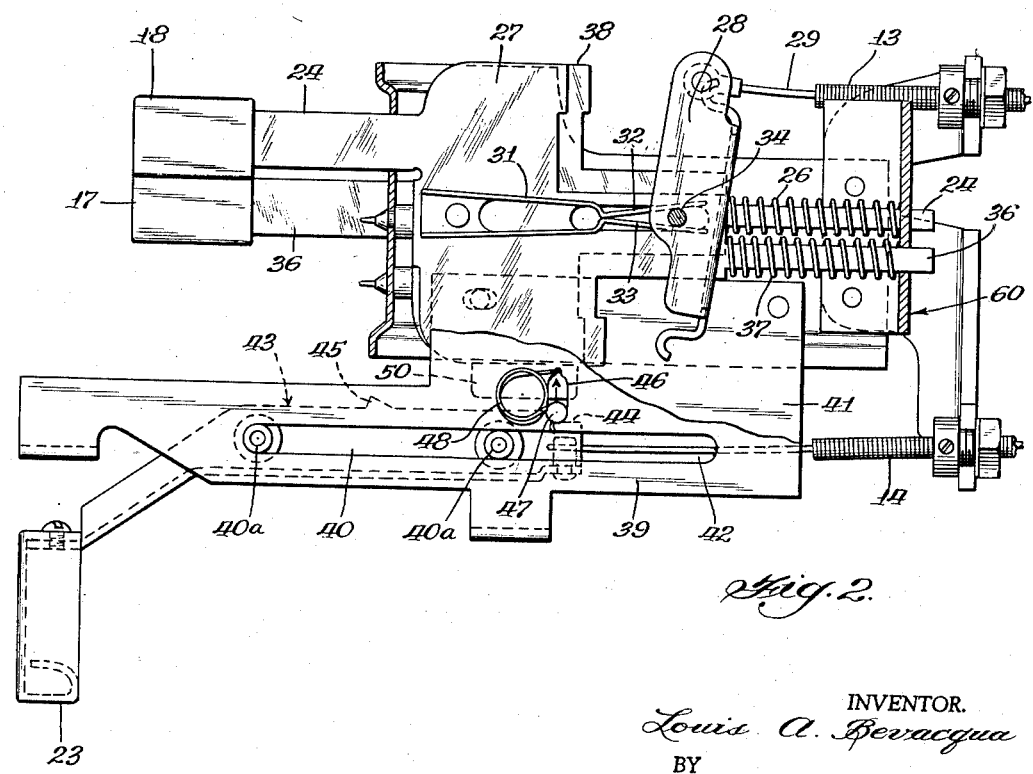
Fig. 2 is an enlarged view partly in section taken on the line 2—2 of Fig. 1 through the gear selector and showing the neutral pushbutton arm in its unactuated position.

As shown in Fig. 2, the neutral pushbutton 18 actuates a neutral bushbutton arm 24 which works against the return spring 26. The neutral pushbutton arm 24 also includes a camming portion 27 which is adapted to engage the treadle 28 when actuated. The treadle 28 is connected to the control cable 13 through a suitable connector 29. The pushbutton arm 24 carries on its surface a resilient pin 31 including arms 32 and 33 which engage the transverse treadle shaft 34.

The second drive pushbutton 17 actuates the drive pushbutton arm 36 which works against spring 37. The drive pushbutton arm 36 likewise includes a camming portion 38 also adapted to engage the treadle 28 when it is actuated. The drive pushbutton arm also carries on its surface a metal pin similar to the pin 31. The other three pushbuttons 19, 21 and 22 also actuate corresponding arms which include camming portions for engaging the treadle, work against corresponding springs and are constructed and function in the same general manner as the neutral and drive pushbutton arms.

The park slide 23 is longitudinally slidable within parallel slots 40 on rollers 40a between the brackets 39 and 41 (best shown in Fig. 5). Slide 23 is operatively connected to the control cable 14 through a suitable connector 42. As shown in Fig. 2, the upper surface 43 (that is the surface toward the pushbutton arms) includes a forwardly located depressed lip portion 44 (defined by sloping shoulder 44a) and a rearwardly located projecting tooth 45. The brackets 39 and 41 include a pair of vertical slots 46 within which are held the ends of locking bar 47. A pair of springs 48 and 49 are arranged to hold the transverse locking bar 47 against the upper surface 43 of the park slide 23.

The neutral cam 27 is provided with a downwardly extending projecting portion or projection 50 which, as shown in Fig. 2, limits the movement of the locking bar 47 within the slots 46. Although projection 50 is shown as an attachment to cam 27, the same effect may be provided by making a corresponding portion of cam 27 wider than the other cams such as 38. Although conveniently forming part of cam 27, projection 50 may extend from other portions of the neutral pushbutton arm if the various parts of the selector are appropriately positioned. With the projection 50 of cam 27 in the position shown in Fig. 2, it is impossible to slide the park slide 23 into its locking position toward the back end 60 of the selector 10, that is, the end remote from the pushbuttons. This is because the locking bar 47 cannot move sufficiently far within slots 46 to permit clearance of the raised portion 43a of upper surface 43 of the park slide 23. The projection 50 is in the position shown in Fig. 2 whenever the neutral pushbutton arm 24 is in its unactuated position. Thus, the park slide 23 is effectively locked in its unactuated position except when the transmission is set into neutral by the actuation of the neutral pushbutton arm 24.

Fig. 3 illustrates the position of the neutral push-button arm 24 when it is in its actuated position and the transmission is set in neutral. The projection 50 is moved forward and clear of the locking bar 47. With the transmission in neutral, if it is desired to lock the transmission of an automobile embodying the selector device of the invention, the park slide 23 can be slid toward the back end 60 of the selector, that is, toward the end remote from the pushbuttons. This movement will cause sloping shoulder 44a to lift the locking bar 47 whose movement within the slots 46 is no longer restricted by the projection 50 so that it will ride along the raised portion 43a of the upper surface 43 of the park slide 23 as the latter moves beneath it. The direction in which bar 47 is movable is indicated by the arrows within slots 46 shown in Figs. 2 and 3.

Fig. 4 shows park slide 23 in its actuated position with the locking bar 47 engaging the tooth 45 which provides a detent action when the park slide 23 is in its actuated position.

With the park slide 23 in its actuated position as shown in Fig. 4, any turning of the treadle 28 to set the transmission in one of the drive positions would produce serious damage. Such movement of the treadle could be brought about in other devices by inadvertent actuation of one of the drive pushbutton arms to bring its corresponding cam against the treadle thus causing the treadle shaft 34 to turn slightly and release pin 31 thus causing the neutral pushbutton arm to be returned to its unactuated position by spring 26. However, in accordance with this invention, movement of the treadle 28 is prevented because any movement of the neutral pushbutton arm 24 towards its unactuated position is blocked by the locking bar 47 which restricts the longitudinal movement of projection 50 of neutral cam 27. The locking bar 47 is of sufficient diameter so that projection 50 will not clear it as the cam 27 begins to move toward the end of the selector adjacent the pushbuttons. The treadle 28 is, therefore, effectively locked in position by cam 27 and the transmission setting held in neutral. When the park slide 23 is fully retracted to the position shown in Fig. 3, the locking bar 47 drops into the depressed lip portion 44 and is now vertically spaced from the projection 50 so that longitudinal movement of the neutral pushbutton arm 24 to its unactuated position is again possible and the transmisison can be set in one of the drive gears by actuation of the appropriate pushbutton.

The selector device of the invention provides important safety features which automatically eliminate the danger of damage to the transmission of an automobile embodying a pushbutton gear selector by preventing inadvertent locking of the transmission while it is in one of its drive positions and also preventing the accidental shifting to a drive position while the transmssion is locked as might occur in starting the automobile.

I claim:

1. A pushbutton selector for controlling an automatic transmission including in combination, a longitudinally movable slide, a longitudinally movable pushbutton arm having a projecting portion, said slide and said arm adapted to both occupy actuated positions simultaneously, a transverse locking member held against said slide, said locking member cooperating with said projecting portion to limit longitudinal movement of said slide with said slide and said arm in unactuated positions, said locking member adapted to be displaced by movement of said slide to a position effective to lock said arm in its actuated position.

2. A pushbutton selector for controlling an automatic transmission including in combination, a longitudinally movable slide adapted to lock said transmission when said slide is moved to its actuated position, a pushbutton arm for setting said transmission in neutral when said arm is in its actuated position, said arm being movable longitudinally parallel to said slide, a projecting portion on said arm extending toward said slide, and a transverse locking member held against said slide and cooperating with said projecting portion to limit longitudinal movement of said slide when said pushbutton arm is in its unactuated position, to thereby prevent locking of said transmission.

3. A pushbutton selector for controlling an automatic transmission including in combination, a longitudinally movable slide adapted to lock said transmission when said slide is in its actuated position, a pushbutton arm for setting said transmission in neutral when said arm is in its actuated position, said arm movable longitudinally parallel to said slide, a projecting portion on said arm extending toward said slide, and a transverse locking member resiliently held against said slide and adapted to be positioned by longitudinal movement of said slide to a position which blocks movement of said projecting portion of said arm, thereby to hold said arm in its actuated position when said slide is in its actuated position.

4. A pushbutton selector for controlling an automatic transmission including in combination, a longitudinally movable slide adapted to lock said transmission when said slide is moved to its actuated position, a pushbutton arm for setting said transmission in neutral when said arm is in its actuated position, said arm movable longitudinally parallel to said slide, a projecting portion on said arm and extending toward said slide, and a transverse locking bar held against said slide and movable toward and away from said arm by longitudinal movement of said slide, said projecting portion being positioned to limit such movement of said bar when said arm is in its unactuated position so said bar is held in a position restricting longitudinal movement of said slide, said projecting portion being so positioned when said arm is in its actuated position that movement of said slide to its actuated position will move said bar toward said arm to a position preventing movement of said arm from its actuated position.

5. A pushbutton selector for controlling an automatic transmission, said selector including in combination, a longitudinally movable slide adapted to lock said transmission when said slide is moved to its actuated position, said slide having an upper surface which includes a depressed lip portion, and a raised portion, a pushbutton arm for setting said transmission in neutral when said arm is in its actuated position, said arm being movable longitudinally parallel to said slide, a projecting portion on said arm and extending toward said slide, a transverse locking bar extending across said slide fixed against longitudinal movement but movable toward and away from said arm by longitudinal movement of said slide, and spring means holding said bar against said upper surface of said slide, said bar positioned on said depressed lip portion of said slide when said slide is in its unactuated position, said projecting portion being positioned when said arm is in its unactuated position to restrict movement of said bar toward said arm, said bar when retained on said lip permitting longitudinal movement of said arm toward its actuated position, movement of said arm to its actuated position permitting longitudinal movement of said slide to its actuated position and consequent movement of said bar from said depressed lip portion to said raised portion of the surface of said slide, in which position said bar serves to hold said arm in its actuated position.

6. A selector device including in combination, a first longitudinally movable member, a second longitudinally movable member extending substantially parallel to the first, a transverse locking member between said first and second members, means for holding said locking member against a surface of said first member, said surface being provided with camming means for moving said locking member toward and away from said second member upon movement of said first member between actuated and unactuated positions, and a projection on said second member positioned to block movement of said locking member with both first and second members in their respective unactuated positions thereby preventing actuation of said first member, with said locking member being positioned with respect to said projection to retain said second member in its actuated position with said first member in its actuated position.

7. A selector device including in combination, a first longitudinally movable member, a second longitudinally movable member extending substantially parallel to the first, an intermediate member positioned for actuation by said second member, a transverse locking member between said first and second members, means for holding said locking member against a surface of said first member, said surface being provided with camming means for moving said locking member toward and away from said second member upon movement of said first member between actuated and unactuated positions, a projection on said second member positioned to block movement of said locking member with both first and second members in their respective unactuated positions thereby preventing actuation of said first member, with said locking member adapted to cooperate with said projection to retain said second member in its actuated position with said first member in its actuated position, and at least one additional longitudinally movable member parallel to said second member spaced from said locking member and movable independently thereof for actuating said intermediate member.

8. A selector device including in combination a first longitudinally movable member, a second longitudinally movable member extending substantially parallel to the first, said first member having a camming surface with a depressed lip portion and a raised portion, a transverse locking member between said first and second members, means for holding said locking member against the camming surface of said first member, a projection on said second member positioned to block movement of said locking member with both first and second members in their respective unactuated positions and said locking member against said lip portion of said camming surface of said first member and blocked from movement therefrom by said projection thereby preventing actuation of said first member, movement of said second member to its actuated position permitting longitudinal movement of said first member to its actuated position and consequent movement of said locking member from said depressed lip portion to said raised portion of the camming surface of said first member in which position said locking member cooperates with said projection to hold said second member in its actuated position.

References Cited in the file of this patent

UNITED STATES PATENTS 2,232,217     Dijksterhuis     Feb. 18, 1941